(12) United States Patent
Yoneda et al.

(10) Patent No.: US 7,015,184 B2
(45) Date of Patent: Mar. 21, 2006

(54) CLEANING SOLUTION, AND METHOD AND APPARATUS FOR CLEANING USING THE SAME

(75) Inventors: Tetsuya Yoneda, Nabari (JP); Shin-ichi Ohhori, Yao (JP); Kazuhiro Emoto, Nara (JP); Yasutake Sumida, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 650 days.

(21) Appl. No.: 10/221,224

(22) PCT Filed: Mar. 2, 2001

(86) PCT No.: PCT/JP01/01664

§ 371 (c)(1),
(2), (4) Date: Sep. 10, 2002

(87) PCT Pub. No.: WO01/66682

PCT Pub. Date: Sep. 13, 2001

(65) Prior Publication Data

US 2003/0109398 A1 Jun. 12, 2003

(30) Foreign Application Priority Data

Mar. 10, 2000 (JP) .......................................... 2000-65915
Mar. 10, 2000 (JP) .......................................... 2000-65917

(51) Int. Cl.
*C11D 3/22* (2006.01)

(52) U.S. Cl. .................................................... 510/220
(58) Field of Classification Search ................. 510/509, 510/220
See application file for complete search history.

(56) References Cited

U.S. PATENT DOCUMENTS 5,947,135 A   9/1999   Sumida et al.

FOREIGN PATENT DOCUMENTS

| JP | 5-137689 A | 6/1993 |
|----|------------|--------|
| JP | 8-47473 A | 2/1996 |
| JP | 8-71131 A | 3/1996 |
| JP | 8-155459 A | 6/1996 |
| JP | 8-288603 A | 9/1996 |
| JP | 8-283798 A | 10/1996 |
| JP | 9-70381 A | 3/1997 |
| JP | 9-75287 A | 3/1997 |
| JP | 2626778 B2 | 4/1997 |
| JP | 9-173268 A | 7/1997 |
| JP | 97/46489 A1 | 12/1997 |
| JP | 10-179491 A | 7/1998 |
| JP | 10-309582 A | 11/1998 |
| JP | 10-314746 A | 12/1998 |
| JP | 11-151256 A | 6/1999 |
| JP | 11-217598 A | 8/1999 |
| JP | 2000-73092 A | 3/2000 |

*Primary Examiner*—Lorna M. Douyon
*Assistant Examiner*—John Petruncio
(74) *Attorney, Agent, or Firm*—Birch, Stewart, Kolasch & Birch, LLP.

(57) ABSTRACT

There is provided a washing method which imposes a minimized burden on environment, uses a detergent solution significantly safe for human body, and is also capable of safe and hygienic washing and sterilization and prevents effluents from contributing to pollution, eutrophication and the like. An alkaline buffer solution can be used to swell and dissociate stain from an object to be washed and in the solution a component of the stain mainly of an oily component can be floated to effectively wash the object. It is thus no longer necessary to use a surfactant, as conventional. Furthermore, a substance capable of electrolytically producing hypohalogenous acid having a bactericidal effect can be added so as to electrolytically produce hypohalogenous acid in the buffer solution to more effectively wash and sterilize the object to be washed.

10 Claims, 4 Drawing Sheets

CLEANING SOLUTION, AND METHOD AND APPARATUS FOR CLEANING USING THE SAME

This application is the national phase under 35 U.S.C. §371 of PCT International Application No. PCT/JP01/01664 which has an International filing date of Mar. 2, 2001, which designated the United States of America.

TECHNICAL FIELD

The present invention relates generally to detergent solutions related to washing methods and less contributing to environmental pollution attributed to effluents from washing, and particularly to detergent solutions capable of continuously providing sufficient detergency and bactericidal activity even without containing synthetic detergent, soap or other similar so-called surfactant, and washing apparatuses using the same. More specifically, the present invention relates to a combined washing method using a detergent comprising an alkaline buffer solution and a solution of a salt of a hypohalogenous acid that are obtained by electrolizing a solution of a mixture of an alkaline metal ion-containing aqueous solution and an inorganic salt of halogenous acid, and a washing apparatus using the method.

BACKGROUND ART

Generally, for example as represented by the food industry, a variety of production processes include steps involving washing performed repeatedly. Such washing has conventionally used various types of detergent based on surface activity and, furthermore, biodegradation. Furthermore, in ordinary households also, foods, food utensils clothes and the like are washed by a method pursuant to the above.

Typically commercially available dish washers and sterilizers have used detergent, powdery soap or the like to wash fats and oils, protein, starch and other similar, various types of stains off utensils. Furthermore, the utensils are sterilized often with hot air, hot water or other similar thermal effects in actuality.

One example of a conventional, ordinary household dishwasher is shown in FIG. 5. In the figure, a detergent containing sodium percarbonate, sodium perborate or the like, and a proteolytic enzyme and an amylolytic enzyme blended together is previously introduced into a washing chamber 1. When the chamber is supplied with a determined amount of water, a washing pump 2 is actuated, and water for washing is inducted through a filter 3 to washing pump 2 and the water is pressurized and jetted through a nozzle. The water jetted through nozzle 4 washes utensils 6 placed in a utensil basket 5 and thereafter accumulates at a bottom of washing chamber 1 and is again inducted to washing pump 2, and thus circulates in washing chamber 1. In doing so, a heater 7 heats the water to increase the temperature thereof to increase solubility of a component of stain. Furthermore, large, insoluble leftover or the like on utensils 6 is washed off by the water and captured and removed by filter 3 when it is inducted to washing pump 2 together with the water.

After the washing operation has been completed, a drainage pump operates to discharge the water outside the dishwasher. Thereafter again a determined amount of water is supplied to washing chamber 1 and, as has been in the washing operation, the utensils are rinsed and thus washed (or washed with water circulated without detergent), and after the rinsing and washing operation has been completed the water is again drained out. Typically, this rinsing operation is performed more than once. Thereafter, heater 7 and an air blower fan 8 operate to dry the interior of washing chamber 1 and utensils 6 and the entire process thus completes. While the utensils are washed, the sodium percarbonate, sodium perborate or the like that has blended in the detergent also effectively bleaches tea stain on the utensils, decomposes odors attributed to food stains, and remove germs.

Furthermore, in the electronics industry, organic oil fouling, powdery metal, minerals, and other similar inorganic matters soiling surfaces of printed circuit boards, glass substrates and the like must be washed off. They have conventionally been washed using chlorine-based (carbon tetrachloride for example), chlorofluorocarbons-based solutions, acetone alcohol-based, organic solutions, surfactants, and the like.

However, the surfactants and, furthermore, organic solutions that have been used to wash them remain in effluents in large amounts and have thus contributed to eutrophicated rivers and oceans and other similar water pollution. Furthermore, a large amount of electricity is consumed to provide hot water, which also requires an increased amount of petroleum to generate power and by extension contributes to an increased amount of carbonic acid gas exhausted. Simultaneously, chlorine-, chlorofluorocarbons-, and organic solution-based solutions have negative effects on natural environment as well as human body, including environmental hormones.

In recent years, an electrolytic water generator has been developed to produce acidic water and alkaline water. The alkaline water produced by this apparatus decomposes protein and fats and oils and the acidic water produced thereby sterilizes germs and bleaches stains. Thus a variety of washing apparatuses have been developed with these properties made use of effectively.

For example, Japanese Patent Laying-Open No. 8-71131 proposes a washing apparatus including an electrolytic cell having a cathode and an anode therein and filled with an electrolyte. An object to be washed is immersed therein and a voltage is then applied between the cathode and the anode to pass a DC voltage through the electrolyte to wash and sterilize the object.

Furthermore, Japanese Patent Laying-Open No. 8-47473 proposes a dishwasher provided with a water creator capable of electrolyzing tap water to produce alkaline water and acidic water. The publication discusses that the apparatus's washing chamber can be supplied with the alkaline water and the acidic water selectively to wash an object with the alkaline water and sterilize it with the acidic water.

Furthermore, electrolytic chlorine water, ozone water, sterilants, and ultraviolet radiation are used in washing and sterilization, and heat, vapor and the like are used in sterilization, as disclosed for example in Japanese Patent Laying-Open Nos. 5-137689 and 8-228603.

For dishwashers, in particular, powerful synthetic detergent is generally used. This results in effluents containing a large amount of a detergent component. The effluents may insufficiently be treated in sewage disposal plants to eliminate bacteria. If the effluents are insufficiently treated, and released and flow into rivers and seas, they would have a significantly negative effect on environment. Thus there has been a demand for a method and an apparatus using the method that are developed to impose a minimize load on environment, use a detergent significantly safe for human body, and steadily and hygienically wash an object and maximally prevent effluents from contributing to pollution, eutrophication and the like.

Conventionally, however, for example as described in Japanese Patent Laying-Open No. 5-137689, bleaching utensils, decomposing odors of foods, and removing germs all depend on detergent and to minimize its environmental effects the detergent is adapted to contain less oxidative sodium percarbonate, sodium perborate or the like blended therein. As such, utensils are bleached and deodorized insufficiently. Furthermore, if foods are washed with the detergent and thereafter rinsed insufficiently or they are fresh vegetables, fruits and the like often having depressions, then carbonate, borate, or the like that corresponds to a product from a component of the detergent that has been decomposed would readily remain in and/or on the washed foods disadvantageously.

Furthermore, a conventional dishwasher sterilizes utensils at no less than 75° C. for at least two minutes when they are finally rinsed. More specifically, a household dishwasher heats water to no less than 75° C. and jets the heated water against utensils and thus rinse them for at least two minutes, thereby increasing the temperature of the utensils and thus sterilizing them. Heating the rinsing water to at least 75° C. entails supplying a large amount of electric energy and thus interferes with energy conservation.

Other washing and sterilization methods still have disadvantages in terms of persistence of bactericidal activity and stability of sterilant. For example, hypochlorous acid in an acidic state of a pH of no more than five does not exist stable for a long period of time as it rapidly decomposes and becomes chlorine gas. Furthermore it is also known that hypochlorous acid in a highly alkaline state of a pH of no less than 8.5 is slow in proceeding with a reaction producing available active chlorine through decomposition that presents bactericidal activity. To overcome such pH-dependent disadvantages to allow hypochlorous acid to present its bactericidal activity, a detergent solution needs to have a steady pH within a pH range allowing significantly steady decomposition. More specifically, a technique is required to maintain the solution within a range approximately from a pH of seven to five to maintain effective hypochlorous acid of a concentration sufficient to present bactericidal activity to provide an enhanced bactericidal effect.

As has been described above, a variety of prior arts have been disclosed in relation to washing and sterilization. There also exist hypochlorous acid and the like that are in effect used in medical institutions to wash and sterilize paths for dripped transfusion, although they do not overcome the disadvantages described above.

DISCLOSURE OF THE INVENTION

The present inventors have generally and variously studied in terms of environment, safety, energy conservation, efficiency of washing and sterilization, and, furthermore, stability and arrived at the present invention. More specifically, the present invention provides a detergent solution electrolytically produced from a solution of a mixture of an alkali metal ion-containing aqueous solution and an inorganic salt of halogenous acid to simultaneously produce a detergent solution comprising an alkaline buffer solution and a solution of hypohalogenous acid, and the present invention relates to a combined washing method capable of washing an object with the detergent solution comprising the alkaline buffer solution and of deodorizing and sterilizing the object with the solution of hypohalogenous acid, and an apparatus using the method.

The present invention provides a washer, a dishwasher in particular, producing hypohydrogen acid acting to bleach and sterilize utensils. The washer includes a device supplying an inorganic salt of halogenous acid such as a solution of sodium chloride and an electrolytic cell arranged intermediate a path circulating water for washing utensils and in the cell an electrode for electrolysis is arranged so that without decomposing a detergent during storage or blending an oxidizer inactivating an enzyme it can produce hypochlorous acid acting to significantly bleach and sterilize utensils.

Furthermore, after utensils have been dried, water can be electrolyzed in a water retaining portion to sterilize bacteria bred with time in the water retaining portion and decompose organic matters adhering to a pipe of the water retaining portion. A hygienic dishwasher can thus be provided.

If a detergent solution of hypochlorous acid remains on foods, the acid's bactericidal component is hardly introduced orally as hypochlorous acid is highly autolytic (or has a high non-persistence); hypochlorous acid is not only highly bactericidal but can only exist in an aqueous solution so that it spontaneously decomposes and is thus eliminated when washed utensils and foods are dried.

The present invention resides in using an alkaline buffer solution to swell and dissociate a stain on an object so as to float in the solution a component of the stain mainly of fats and oils. An "alkaline buffer solution" herein generally refers to an aqueous solution acting to alleviate effects attributed to external temperature, a pH changing factor or stains in/on objects to be washed, and germs. In general, the buffer solution stabilizes pH and the like, as represented by the following expression:

For a solution of a mixture of a weak acid HA and a salt thereof BA, $$BA \rightarrow B^+ + A^- \tag{1}$$

Furthermore, HA dissociates as follows:

$$HA \rightarrow H^+ + A^- \tag{2}$$

although the equilibrium represented by expression (2) proceeds rightward only slightly. In other words, HA only slightly dissociates. As such, the concentration of A- in the solution of the mixture is determined by that of BA by complete dissociation of BA represented in expression (1). If such a solution has H+, OH- or the like introduced therein more or less, the equilibrium in expression (2) moving rightward and leftward allows an apparently invariable hydrogen ion concentration. That is, variation in pH is significantly reduced.

pH is calculated by the following equations:

$$pH = \log K + \log \frac{[BA]}{[HA]} \tag{3}$$

$$K = \frac{[B^+][A^-]}{[BA]} \tag{4}$$

wherein K represents a dissociation constant of expression (2).

More specifically by way of example if the alkaline buffer solution is a solution of a mixture of sodium bicarbonate and sodium hydroxide then the sodium hydroxide completely dissociates, as follows:

$$NaOH \rightarrow Na^+ + OH^- \tag{5}$$

whereas the sodium bicarbonate $NaHCO_3$ only slightly dissociates:

$$NaHCO_3 \rightleftharpoons Na^+ + HCO_3^- \tag{6}$$

$$HCO_3^- \rightleftharpoons H^+ + CO_3^{2-} \tag{7}$$

If a solution having such an alkaline buffering effect is used as a detergent solution, reactivity with a substance of a stain can be maintained to be constant and active so that an object to be washed that is placed in the washing chamber can have a stain effectively removed therefrom and in addition if alkalinity as a washing process proceeds is affected to vary in pH as a component of the stain dissolves into the solution, the component's effect(s) can be alleviated so that variation in pH can be small and detergency can thus be maintained.

Although various types of such alkaline buffer solutions can be enumerated, they comply with the National Bureau of Standards (NBS). Alternatively, composition ratios described in Chemical Handbook, basic edition II, published by Maruzen, page 355 can be used to provide buffer solutions of different pHs.

Among others, a buffer solution containing a salt of a weak acid (a salt of sodium, potassium or other similar alkaline metals) as a main component can suitably be used when environment, detergency, and, furthermore, cost are considered. The weak acid can for example be carbonic acid, boric acid, phosphoric acid or the like, although phosphoric acid and a salt thereof are not preferable as they are significantly associated with eutrophication A specific buffer used in the present invention that is preferable in terms of safety, detergency, environment and cost can for example be sodium hydrogencarbonate, sodium carbonate, potassium carbonate, sodium tetraborate or potassium tetraborate, or a complex salt thereof. Furthermore, in some case, a small amount, e.g., no more than 30% by weight of an organic buffer such as sodium acetate may also be added as an assistant of the inorganic buffer.

These alkaline buffer solutions are not particularly defined in concentration. In general, higher concentrations provide more significant buffering effects and when concentration exceeds a determined value a buffering agent disadvantageously precipitates. Accordingly, a relatively high concentration of approximately 10% by weight is preferable, although several % by weight may be applied when cost is considered. Water for washing may have any temperature of no less than room temperature that is not that of cold water (no more than 15° C.).

In some cases, a small amount of surfactant (nonionic surfactant in particular) can be added to the alkaline buffer solution of the present invention to provide a synergistic detergent effect.

Furthermore, a substance having an effect preventing re-adherence of a substance washed off and thus liberated from an object to be washed (i.e., a re-adhesion preventive) can be added to more effectively wash the object. Such re-adhesion preventives generally used are carboxymethyl cellulose (CMC), a methyl cellulose (MC), hydroxyethyl cellulose and other similar cellulose derivatives, and polyethylene glycol, polyvinyl alcohol, polyvinyl pyrrolidone, saponin and the like. These surfactants and re-adhesion preventives may be added in any amount no more than 30% by weight relative to the buffer.

The present invention provides a dishwasher provided with a device supplying an aqueous solution of sodium chloride and an electrode for electrolysis intermediate a washing water circulating path to generate an ion of a hypohalogenous acid acting to bleach and sterilize utensils and foods.

More specifically, there can be provided a dishwasher having a washing chamber accommodating utensils or other similar objects to be washed, and circulating and jetting a detergent solution in the washing chamber to wash the objects that is characterized in that an alkaline metal ion-containing aqueous solution is electrolyzed by applying a voltage to an electrode to produce a detergent solution, that an alkaline metal ion-containing aqueous solution with an inorganic salt of halogenous acid mixed and thus dissolved therein is similarly electrolyzed to produce a bactericidal detergent solution, or furthermore that an inorganic salt of halogenous acid or an aqueous solution thereof, more specifically sodium chloride or a solution thereof, is supplied through a device provided internal to the dishwasher to introduce the salt or the solution thereinto, and after a main washing operation when an object is being rinsed, electrolysis is effected to produce a detergent solution containing an ion of hypohalogenous acid and use the produced solution to rinse the object so as to bleach and sterilize the object while washing it.

Furthermore, if hypohalogenous acid is used for sterilization, only a small amount thereof remains after it is dried. As such, if the acid is used to wash foods, it would hardly be introduced orally and it is thus highly safe. Furthermore for a similar reason it can also be used to produce water for washing and sterilizing medical equipment. The percent solution may be extracted externally from an electrolytic cell of a washer and used to wash a path of dropped transfusion, wash and thus sterilize hands, use as a base (or acidic water) of a lotion, and allow other similar developed applications.

Electrolytic water is produced by using an ion exchange membrane or without using it. To produce hypohalogenous acid of a high concentration, however, using an ion exchange membrane is generally preferable. Furthermore, if the ion exchange membrane's function is considered, one type thereof or a cation exchange membrane or two types thereof or cation and anion exchange membranes to provide different functions can be used, as appropriate, to enhance a function that produces electrolytic water so as to provide further enhanced detergency and bactericidal activity.

Furthermore, although chlorine can be supplied representatively from sodium chloride, it may be supplied for example from sodium hypochlorite or potassium chloride.

BEST MODE FOR CARRYING OUT THE INVENTION

Hereinafter a method used in a dishwasher with an electrolytic cell to wash and sterilize an object will generally be outlined.

Figure 1:
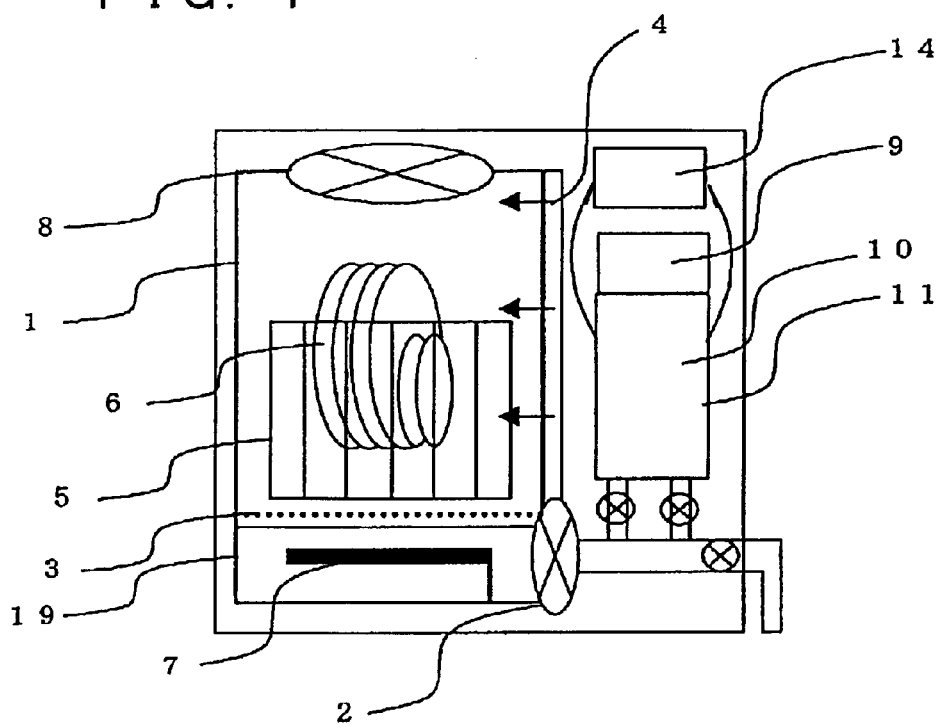
FIG. 1 shows a concept of a dishwasher used in an embodiment of the present invention.

FIG. 1 schematically shows a configuration of one example of an embodiment of a dishwasher of the present invention. In this dishwasher, although not shown in the figure, tap water or water from any other similar source is supplied to a mixing vessel 9 and therein an alkaline metal ion-containing compound, such as one of sodium hydrogencarbonate, sodium carbonate, potassium hydorgencarbonate, potassium carbonate, lithium carbonate, sodium tetraborate and a mixture thereof, is introduced and agitated and dissolved to provide an aqueous solution thereof and furthermore an inorganic salt of halogenous acid is added thereto to prepare a solution of a mixture. The compound and the salt may be introduced and mixed together by various appropriate methods, although not illustrated. An electrolyte 10 thus prepared is supplied to an electrolytic cell 11. For the sake of convenience, mixing vessel 9 and electrolytic cell 11 may be provided in the form of a single container, so that from vessel 9 to cell 11 the electrolyte can be supplied by a simplified operation.

Figure 2:
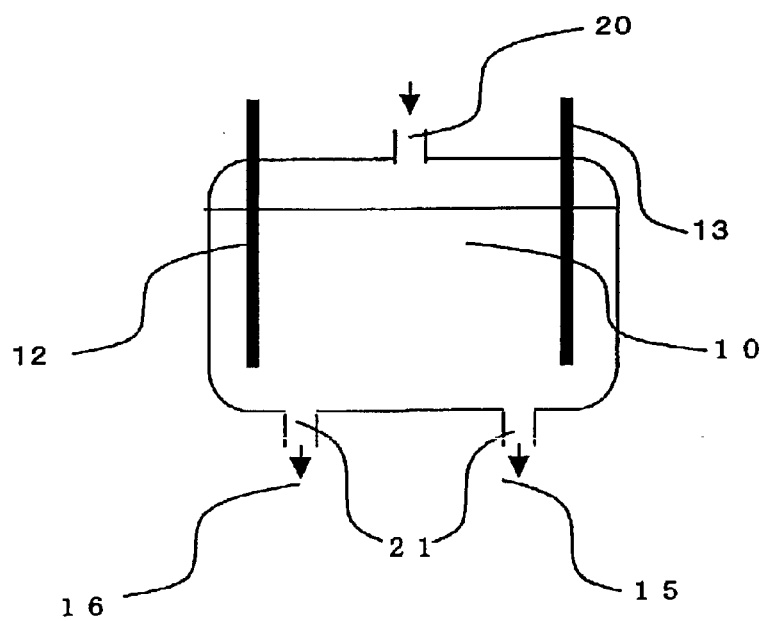
FIG. 2 shows a concept of an electrolytic cell incorporated in the dishwasher of the present invention used in a first embodiment.

FIG. 2 shows one embodiment of the electrolytic cell. In electrolytic cell 11, sandwiching a cathode 12 and an anode 13 an appropriately controlled voltage is supplied by a DC power source 14 and an electric current is adjusted to feed power to effect electrolysis. Thus in a vicinity of anode 13 a detergent solution comprising an alkaline buffer solution 15 can be produced and in a vicinity of cathode 12 a solution of hypohalogenous acid 16 can be produced.

The detergent solution comprising the alkaline buffer solution 15 and the solution of hypohalogenous acid 16 produced in electrolytic cell 11 are jetted through a washing pump 2 against soiled utensils or the like placed in a washing chamber 1 provided in the dishwasher. Stains on the utensils are thus washed off. In jetting the solutions, the detergent solution comprising the alkaline buffer solution 15 can be used mainly to wash stains off and the solution of hypohalogenous acid can be used after utensils have stains washed off when the utensils are rinsed and thus finished washing so that the utensils can effectively be sterilized at low temperature.

In the present method preferably a washing step using the alkaline buffer solution is followed by a rinsing step once or more than once and furthermore by a sterilizing step using a solution of hypohalogenous acid, and if necessary the sterilizing step using the solution of hypohalogenous acid can also be followed by a further rinsing step.

The detergent solution used to wash utensils drops from the utensils and is recovered in a reservoir 19 shown in FIG. 1 and it is drained out through a drainage. Furthermore, reservoir 19 is generally also used as a temporary reservoir of the detergent solution to allow the solution to be used cyclically.

Figure 3:
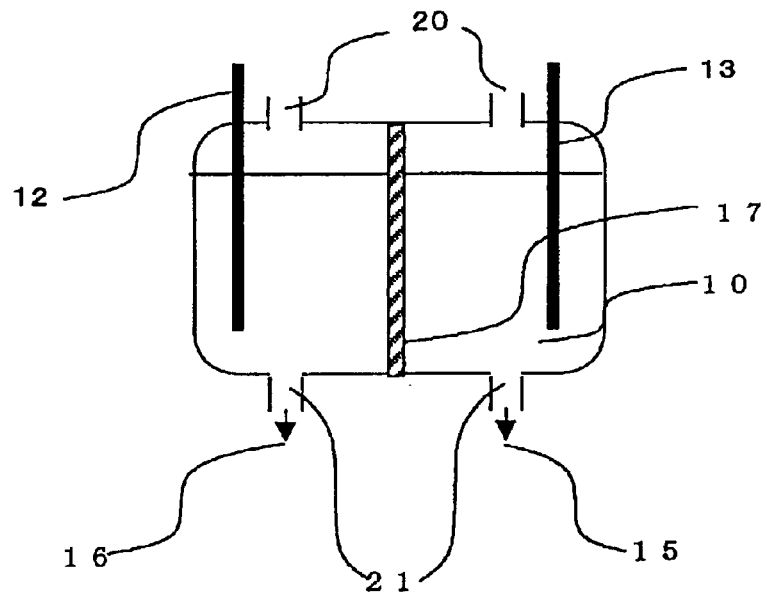
FIG. 3 shows a concept of an electrolytic cell incorporated in the dishwasher of the present invention used in a second embodiment.
Figure 4:
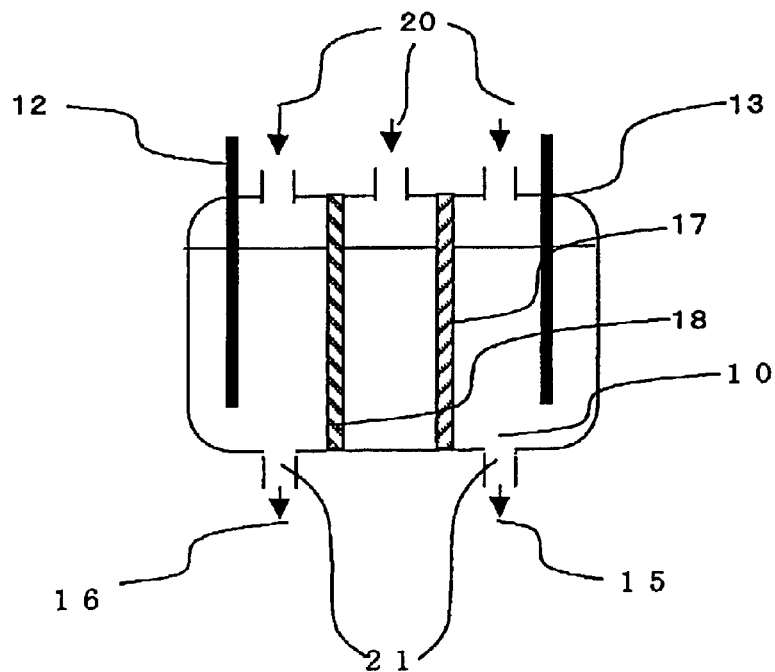
FIG. 4 shows a concept of an electrolytic cell incorporated in the dishwasher of the present invention used in a third embodiment.
Figure 5:
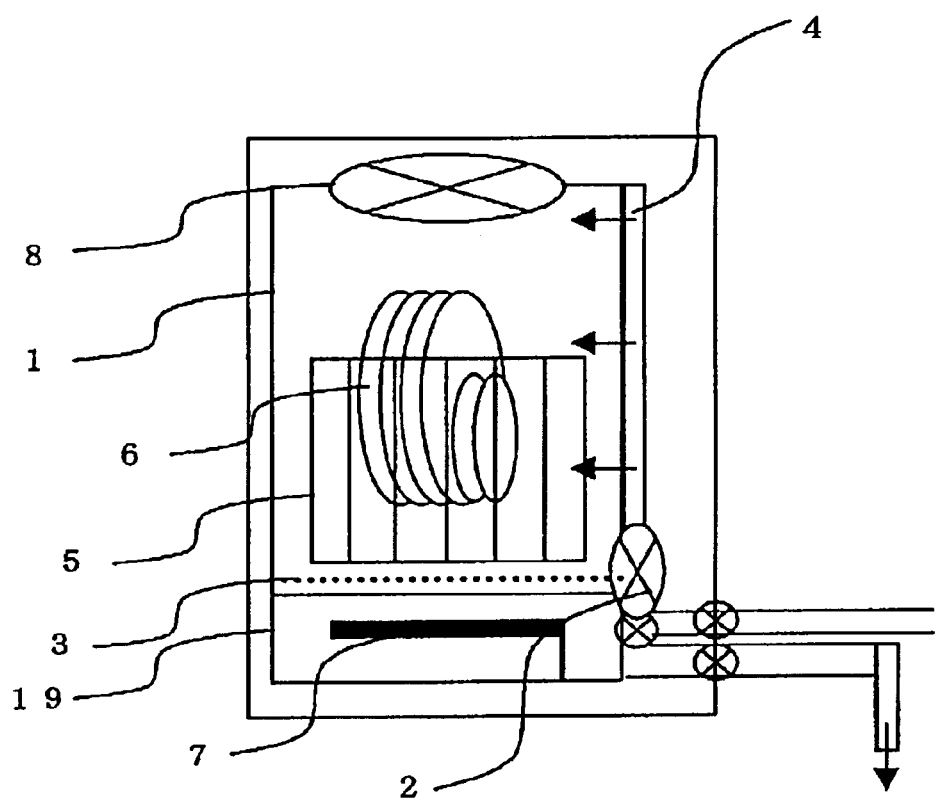
FIG. 5 shows a concept of an example of a conventional dishwasher.

Electrolytic cell 11 assume several possible forms other than that shown in FIG. 2, as shown in FIGS. 2–4. FIG. 2 shows an example of an electrolytic cell which is not divided by an ion exchange membrane (or ion exchange resin), and FIGS. 3 and 4 show those using the membrane. Electrolytic cells are classified in either one of the two types. The latter type includes an electrolytic cell using a single ion exchange resin membrane of a single type and that using two ion exchange resin membranes of two different types, as shown in FIGS. 3 and 4, respectively.

A detergent solution produced by electrolysis generally has a property, as will now be described hereinafter.

Conventionally it has been said that acidic water is generally bactericidal. Although it cannot be generalized as there are different types of germs to be sterilized, acidic water typically exhibits a bactericidal effect at a pH of no more than approximately three. In the present invention, by contrast, an aqueous solution of an inorganic salt of halogenous acid is electrolyzed to produce hypohalogenous acid to provide a significantly bactericidal detergent solution. By way of example, hypochlorous acid, a most common hypohalogenous acid, will now be described. A solution of hypochlorous acid is produced in an electrolytic cell at a cathode and adapted to fall within a generally neutral range corresponding to a pH of 8 to 6 to prevent decomposition of hypochlorous acid to extend the detergent solution's lifetime and also prevent spontaneous decomposition and hence deactivation of the effectively bactericidal hypochlorous acid so that it can effectively be used for sterilization. Furthermore, this electrolytic solution of hypohalogenous acid also acts to buffer a pH. This can reduce a variation in pH attributed to washing and it is thus highly capable of maintaining a pH range exhibiting the bactericidal effect.

On the other hand, the alkaline buffer solution being used to wash an object can similarly maintain by its buffer action a pH range exhibiting detergency. High Detergency can thus be maintained.

Improving the electrolytic cell in structure by using an ion exchange resin membrane can enhance these detergent solutions in detergency because an ion attracted in a vicinity of each electrode through electrolysis is separated appropriately and furthermore detergent solutions produced are not mixed together and can separately be extracted to prevent ions from mixing together as well a pH from having an unexpected variation attributed to the detergent solutions otherwise mixed together.

The electrolytic cell typically, often uses an electrode formed of a lath of titanium plated with platinum, since an electrode thus formed is highly resistant to electrochemical oxidation and reduction and significantly effectively reduces a gas that is generated in electrolysis (or it allows a high gas generation overpotential). Alternatively, a carbon electrode can also be used.

In contrast, rather than providing the electrolytic cell, the reservoir and the like internal to the dishwasher, the electrolytic cell and the like can be arranged external to the dishwasher and a pipe can used to appropriately supply electrolytic water to wash utensils. A solution of hypohalogenous acid thus obtained can also be used to wash foods.

In this example, foods can be placed in a chamber of the dishwasher and washed therein. However, it is not a requirement that foods be washed in the chamber. If effects for example of other stains in the chamber are considered, it is more hygienic to provide a piping that discharges a detergent solution external to the washing apparatus, bypassing a piping which extends from the electrolytic cell to the washing chamber. In other words, the detergent solution is extracted external to the chamber and used for washing. This can extend applicability to washing foods and by extension washing various types of objects such as cutting boards, kitchen knives and the like, and furthermore those having large sizes.

Furthermore, the electrolytic detergent solution can also be used to wash objects other than foods, such as wipe residential windowpanes, and particularly be effective in decomposing and washing stains off.

EXAMPLES

Hereinafter, detergency and bactericidal performance provided when a detergent solution obtained when each electrolytic cell is used, will be described as examples of the present invention and comparative examples with reference to the drawings. The detergent solution can be prepared in various methods and it can be used in a variety of washing apparatuses. As such, conditions for electrolysis and configurations of the apparatuses are not limited to the examples.

A soiled sample for a detergency test was prepared, as described in detail hereinafter.

(1) Preparation of Utensils to Be Washed

Utensils used in the test were a set thereof that can be accommodated in a dishwasher used in the test. Typically, utensils were classified into large plates, medium plates, small plates, bowls and cups of China having a smooth and solid white surface. Glasses were transparent and had no color. Soup bowls and chopsticks were formed of plastic coated with urethane, and forks, spoons and knives were formed of stainless steel.

Initially, the glasses were soiled as follows: half of the set of the glasses each had 80% of its volume filled with tomato juice and the remaining half of glass were each similarly filled with milk and they then had their respective contents removed therefrom. The glasses were allowed to be air-dried for thirty minutes and then turned upside down for five seconds to remove the liquid remaining on their bottoms. Thereafter the glasses were allowed to be air-dried for thirty minutes.

The soup bowls were soiled as follows: the soup bowls each had 70% of its volume filled with miso or bean-paste soup containing wakame or sea weed with fresh green onion added therein. After a period of ten minutes had elapsed, that the miso had precipitated was confirmed. Then, while the miso was still left in the soup bowls, the supernatant was removed. In doing so, wakame of approximately 15 mm by 15 mm and three bits of fresh green onion were left.

The cups were soiled as follows: sencha or brewed tea was poured to fill 70% of each cup and left for 30 minutes. The cup was then emptied gently with tea residue still remaining at the bottom.

The large plates and the spoons were soiled as follows: rice, a raw egg and curry were introduced in an appropriate container and sufficiently mixed together. A spoonful of the mixture (or curry and rice) was placed on each large plate and the plate's center portion was smeared in a diameter of approximately 5 cm uniformly. The curry and rice was then removed therefrom, although ten bits of rice were left thereon. Each spoon was turned upside down and left with front end back sides thereof each having one bit of rice sticking thereto.

The medium plates were soiled as follows: a frozen pork cutlet was heated in a microwave oven and then placed on each medium plate. It then had a source for cutlet spread thereon and it was then cut with a knife and a fork into small pieces. The plate had a central surface of 5 cm in diameter smeared with the cutlet's grease and the source uniformly.

The knives and forks were covered with a film of the cutlet's grease.

The small dishes were soiled as follows: a half-baked ham and egg with the white of the egg substantially hardened was placed and cut on each plate equally with the knife and fork used to cut the pork cutlet. The plate was thus soiled with the yolk and the ham's grease. The knife and fork previously soiled with the film of the cutlet's grease was further soiled with the ham and egg.

The rice bowls were soiled as follows: rice was introduced in each rice bowl and lightly agitated with chopsticks. Three bits of rice were left in the bowl to soil the same.

The chopsticks were soiled as follows: each chopstick was stuck into and drawn from rice in a rice bowl ten times and thereafter it had one bit of rice sticking on a tip thereof to soil the same.

(2) Estimation of Detergency of Detergent Solution

A prescribed number of utensils thus soiled were placed, as defined, in a washing basket 5 arranged in a dishwasher and they were washed, as prescribed. After they were washed, how they were still contaminated was visually estimated, as schematically described below:

In this estimation, complete removal of contamination from a utensil, as visually observed, corresponds to a detergency of 100% and adhesion of a substance to a utensil, as visually observed, corresponds to a detergency of 0%, and a washed utensil that has completely recovered its pre-contaminated state is determined as a utensil A, a washed utensil that has front and back surfaces slightly cloudy and having no luster and a washed utensil that has a front surface free of foreign matters and a back surface with no more than five matters of no more than 0.5 mm by 0.5 mm re-sticking thereto are determined as utensils B, and any utensils other than utensils A and B are determined as utensils C. They are substituted in the following equation:

$$\text{detergency } (100\%) = \frac{\text{no. of utensils } A \times 2/\text{no. of utensils } B}{\text{total no. of utensils} \times 2} \times 100 \quad (8)$$

to represent detergency in %.

(3) Estimation of Bactericidal Activity of Detergent Solution

Ten ml of a detergent solution electrolytically produced by a prescribed method was introduced on a petri dish having a standard sterile culture medium with a prescribed amount of germ previously applied thereto. After immersion for ten minutes, the liquid was discarded. After the culture medium was washed, the medium as well as a medium that was not washed for comparison were subjected to germ cultivation for a prescribed cultivation temperature and time determined for each strain. After the germ cultivation, the number of colonies in the washed medium was counted and compared with that of colonies in the comparative, non-washed medium, which corresponds to an initial viable cell count. Effectiveness was determined when colonies were reduced in number by no less than one digit and also in total reduced in number to no more than 10/petri dish.

Example 1

In the present example, the aforementioned washing apparatus that has an electrolytic cell without an ion exchange membrane is used to wash an object. In particular, a method using the FIG. 2 electrolytic cell to provide electrolysis to produce a detergent solution will be described with reference to the drawings. In mixing vessel 9, potassium hydrogencarbonate, a compound capable of releasing an alkaline metal ion in an aqueous solution, is dissolved in water. 60 g of the compound is dissolved per litter of water. Preferably the compound is introduced in an amount providing a concentration ranging from a value in a vicinity of a saturated concentration substantially at room temperature to no less than one tenth of the saturated concentration. In this aqueous solution, potassium chloride as an inorganic salt of halogenous acid is added in a concentration of 30 g/l, and mixed and dissolved. Preferably it is added in an amount to provide a concentration of no more than one half of the concentration provided by the dissolved compound capable of releasing an alkaline metal ion. An electrolyte thus prepared is supplied through an electrolyte feeding port to electrolytic cell 11. It is electrolyzed in electrolytic cell 11 using a constant-current power source 14 of a maximal voltage of 12V to produce a detergent solution comprising an alkaline buffer solution 15 in a vicinity of anode 13 and a solution of hypochlorous acid 16 in a vicinity of cathode 12. The alkaline buffer solution obtained in the vicinity of the anode is output through a detergent solution output port 21 and used as a detergent solution. Similarly, the detergent solution containing hypochlorous acid that is produced in the vicinity of the cathode is output through detergent solution output port 21 and used as a sterilizing detergent solution.

The alkaline buffer solution obtained in the vicinity of the anode is initially used to wash the utensils. Thereafter, water is used to rinse the utensils and the aqueous sterilizer containing hypochlorous acid that is produced in the vicinity of the cathode is used to finally wash and sterilize the utensils. It can of course be used as water for rinsing utensils or the like, as described above, to provide enhanced detergency and bactericidal activity on surfaces of the utensils. Typical utensils are washed at around room temperature if energy conservation is considered. The detergent solution is used in the washing step in a manner similar to that is used in a conventional dishwasher.

For comparison, utensils are washed in both examples and comparative examples using a common washing system, a common amount of water, and a common temperature of water, unless otherwise specified. More specifically, a washing step (ten minutes)→a first rinsing step (one minute)→a second rinsing step (three minutes)→a third rinsing step (three minutes)→a final rinsing step (two minutes) are effected.

The washing step and each rinsing step each use a type of water and provide a result in detergency, as shown in Table 1, together with other test results. A dishwasher which initially washes utensils with an alkaline buffer solution to remove fats and oils, protein, starch and other juices therefrom and then washes and thus sterilizes the utensils with a solution of hypochlorous acid and then mixes the used detergent solutions together and drains the mixture out, is also useful in environmental considerations.

The solution of hypochlorous acid produced in the present method is tested for bactericidal activity and provides a result, as shown in Table 2, together with other test results.

Example 2

Example 2 uses electrolytic cell 11 different from that used in Example 1. A method using the FIG. 3 electrolytic cell to provide electrolysis to produce an electrolytic detergent solution will be described with reference to the drawings. The electrolytic cell of Example 2 differs from that of Example 1 in that between cathode 12 and anode 13 there exists a cation exchange resin membrane 17.

In the reservoir in a vicinity of cathode 12 an aqueous solution having sodium chloride dissolved therein as an inorganic salt of halogenous acid in a concentration of 15 g/l is introduced as an electrolyte, and in the reservoir in a vicinity of anode 13 an aqueous solution having sodium hydrogencarbonate dissolved therein in a concentration of 50 g/l as a compound capable of releasing an alkaline ion is introduced as an electrolyte. They are electrolyzed in a manner similar to that of Example 1, and the detergent solution comprising an alkaline buffer solution 15 and the solution of hypochlorous acid 16 are used to wash the utensils. Since the electrolytic cell is divided by the cation exchange membrane, sodium ions are reduced and ions of hypochlorous acid are accordingly reduced, and acidic electrolytic water mainly containing hypochlorous acid is instead provided. The aqueous solution has a concentration and electrolysis is provided under a condition, as described in Example 1. Detergency and bactericidal activity test results are shown in Tables 1 and 2, respectively.

Example 3

Example 3 uses electrolytic cell 11 different from that of Example 1. A method using the FIG. 4 electrolytic cell to provide electrolysis to produce an electrolytic detergent solution will be described with reference to the drawings. The washing apparatus used is similar in configuration to that of Example 1 except that the electrolytic cell is sectioned into three by ion exchange membranes. Detergency and bactericidal activity test results are shown in Tables 1 and 2, respectively. In the present example, the electrolytic cell is sectioned into three by a cation exchange resin membrane 17 and anion exchange resin membrane 18.

In the reservoir in a vicinity of cathode 12 an aqueous solution having sodium chloride dissolved therein as an inorganic salt of halogenous acid in a concentration of 20 g/l is introduced as an electrolyte. In the reservoir in a vicinity of anode 13 an aqueous solution having sodium hydrogencarbonate dissolved therein in a concentration 40 g/l as a compound capable of releasing an alkaline metal ion is introduced as an electrolyte. In the reservoir at an intermediate portion an aqueous solution of a mixture of a compound capable of releasing an alkaline metal ion and an inorganic salt of halogenous acid (sodium carbonate in a concentration 100 g/l and sodium chloride in a concentration of 20 g/l) is introduced as an electrolyte. A detergent solution is produced. The aqueous solution has a concentration and electrolysis is provided under a condition, as described in Example 1. A manner similar to those described in Examples 1 and 2 is used to electrolytically produce the detergent solution comprising an alkaline buffer solution 15 and the solution of hypochlorous acid 16 and use them to wash the utensils.

Typically, the utensils are initially washed with the detergent solution comprising the alkaline buffer solution to remove fats and oils, protein, starch and other juices therefrom. The utensils are then rinsed with water. The utensils are then finally rinsed with the solution of hypochlorous acid and thus washed and sterilized. The utensils may be immersed in the solution of hypochlorous acid so that they are finally sterilized. The solution of hypochlorous acid of the present example is distinguished from those of Examples 1 and 2 by a difference in the concentration of the produced acid of hypochlorous acid contained in a sterilizer solution.

As described above, using an ion exchange membrane can accelerate concentrating hypochlorous acid. Furthermore, a buffer action is also used, and detergency and bactericidal activity depend on pH. As such, in a buffer solution with a steady pH, they can particularly constantly be maintained.

Example 4

Approximately two litters of the detergent solution comprising an alkaline buffer solution that is obtained in Example 2 is mixed with a small amount (0.1 g to 0.3 g) of polyoxyethylene nonylphenyl ether serving as a nonionic surfactant, and the mixture is used to wash utensils, as described in Example 1. Its detergency result is shown in Table 1. It can be understood from Table 1 that adding a small amount of a nonionic surfactant, in particular, contributes to enhanced detergency.

Example 5

The utensils are washed under the same conditions as Example 2 except that in the reservoir in a vicinity of cathode 12 sodium bromide serving as an inorganic salt of halogenous acid is dissolved in a concentration of 15 g/l.

Detergency is measured, as presented in Table 1. It is understood from Table 1 that the present example provides substantially the same detergency as Example 2.

Comparative Example 1

A standard dishwasher detergent is used. The electrolytic alkaline buffer solution is replaced in the washing step of Example 1 by a standard detergent. In the final rinsing step, water heated to 77° C. is used to wash and sterilize the utensils for two minutes. Detergency, as compared, is shown in Table 1. Furthermore, bactericidal activity, as compared, is shown in Table 2.

Comparative Example 2

The standard detergent solution of Comparative Example 1 is replaced with ion exchanged water. Detergency and bactericidal activity are shown in Tables 1 and 2.

Comparative Example 3

Alkaline ion water of a pH of 10 produced electrolytically by a commercially available ion water generator is used in the washing step of Example 1 in place of the electrolytic alkaline buffer solution and acidic water of room temperature having a pH of 4 also electrolytically produced is used in the final rinsing step. Detergency and bactericidal activity, as compared, are shown in Tables 1 and 2.

In the present invention an alkaline buffer solution obtained without electrolysis can also be used as a detergent solution and specific examples thereof will now be described in Examples 6–10 and Comparative Examples 4–7. These examples and comparative examples adopt test conditions, as follows:

(1) Preparation of Effluent 59.0 mg of calcium chloride dihydrate and 27.2 mg of magnesium chloride hexahydrate are dissolved in water to provide 1000 ml of an aqueous solution thereof. 1100 ml of the solution is prepared. An effluent is prepared as follows: 10 g of tallow (available from Nihon Yakkyoku) and 10 g of salad oil substituting soy bean oil (available from Nihon Yakkyoku) that are mixed together to provide 20 g of fat and oil; 10 g of commercially available margarine; 0.25 g of monoolein, as defined in lipophilic glycerol monooleate in compliance with standards for materials of cosmetic; and 0.1 g of oil red, as defined in Sudan III color index 26100, added to color a stain so that it can visually be observed whether the stain still adheres to a utensil or has been removed therefrom, are simultaneously dissolved in 60 ml of chloroform.

(2) Preparation of an Object to Be Washed (Slide Glass)/Measurement of Detergency An object as defined in JIS R 3703 is used. It is washed to be clean and then dried, and has its weight measured by

TABLE 1

| | | Examples | | | | | Comparative Examples | | |
|---|---|---|---|---|---|---|---|---|---|
| | | 1 | 2 | 3 | 4 | 5 | 1 | 2 | 3 |
| Types of electrolyte | cathode | — | NaCl | NaCl | — | NaBr | — | — | — |
| | center | KCl KHCO$_3$ | — | Na$_2$CO$_3$ NaCl | NaCl KHCO$_3$ nonionic surfactant | — | — | — | — |
| | anode | — | NaHCO$_3$ | NaHCO$_3$ | — | NaHCO$_3$ | — | — | — |
| pH | cathode | 6.5 | 7.5 | 8.0 | 6.5 | 7.5 | 9.8 | 6.5 | 10.3 |
| | anode | 9.7 | 10.3 | 10.5 | 9.7 | 10.3 | | | 4.3 |
| detergency (%) | | 57 | 61 | 65 | 65 | 60 | 49 | 23 | 35 |

TABLE 2

| | | Examples | | | Comparative Examples | | |
|---|---|---|---|---|---|---|---|
| | | 1 | 2 | 3 | 1 | 2 | 3 |
| Types of Electrolyte | cathode | — | NaCl | NaCl | — | — | — |
| | center | KCl KHCO$_3$ | — | Na$_2$CO$_3$ NaCl | — | — | — |
| | anode | — | NaHCO$_3$ | NaHCO$_3$ | — | — | — |
| pH | cathode | 6.5 | 7.5 | 8.0 | 9.8 | 6.5 | 10.3 |
| | anode | 9.7 | 10.3 | 10.5 | | | 4.3 |
| Bactericidal Activity (%) | | <10$^1$ | <10$^1$ | <10$^1$ | >10$^1$ | >10$^1$ | >10$^5$ |

It has been found from the above results that the method using the detergent solutions of Examples 1 to 5, as shown in Tables 1 and 2, are different in detergency and bactericidal activity than conventional, and superior in contaminant removal and bactericidal activity. Furthermore, it has also been found that adding a small amount of surfactant provides enhanced detergency.

1 mg. The measured weight is used as an initial weight (ag) of the slide glass. The glass is then immersed into the effluent and soiled thereby. Thereafter it is air-dried for one hour and then has its weight measured. The measured weight is a weight (bg) of the glass that has been soiled and then dried.

The object to be washed that has thus been prepared is washed in a test in accordance with JIS K 3362, a method of estimation of detergency of synthetic kitchen detergent. The piece of glass that has been washed is air-dried at room temperature for one hour and then has its weight measured. The measured weight is a weight (cg) of the glass that has been washed and then dried. Detergency is not estimated, as defined in JIS K 3362. Rather, it is determined by an expression (1) based on a variation in weight that is obtained from the measured weights.

Figure 6:
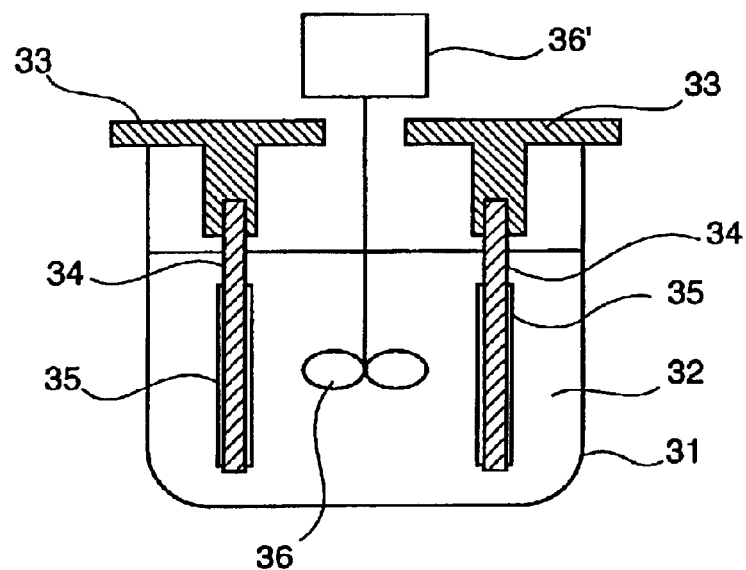
FIG. 6 shows a concept of a test apparatus used in a detergency test in the present invention.

Detergency is measured, as described with reference to FIG. 6. In the figure, a detergent solution is introduced into a typical washing test vessel and the object to be washed is placed therein, and a detergency test is conducted. In the figure, a beaker 31 is filled with an appropriate amount of a detergent solution 32 so that the object to be washed 34 fixed by a sample fixing tool 33 can have a contaminated portion 35 immersed therein. Object 34 is fixed by tool 33 such that object 34 does not drop when an agitator 36 agitates detergent solution 32. The object is also fixed so that the agitation does not result in the object having a changed positional relationship with beaker 31. Agitator 36 agitates the solution in accordance with JIS K 3362 for ten minutes and detergency is estimated by the amount of contamination still held on object 34. Detergency is calculated for each test piece and a numerical value that can be compared with other test pieces is calculated.

$$\text{detergency (\%)} = (b-c)/(b-a) \times 100 \tag{1}$$

Detergency is estimated by an average detergency for three samples simultaneously placed in a washing chamber and having undergone a detergency test.

Example 6

An alkaline buffer solution is prepared as follows: 50 ml of a solution of sodium hydrogencarbonate of 0.05 mol/l with 17.8 ml of a solution of sodium hydroxide of 0.1 mol/l added thereto is diluted with water to provide 100 ml of an aqueous solution. Conveniently, 0.05 mole (0.48 g) of sodium bicarbonate and 0.037 mole (0.15 g) of sodium hydroxide are dissolved in 1000 ml of water and thus mixed together to provide an alkaline buffer solution of a pH of 10.5. The solution is tested for detergency and provides a result, as shown in Table 3.

Example 7

An alkaline buffer solution of a pH of 10.6 is prepared as follows: 50 ml of a solution of sodium tetraborate (borax) of 0.025 mol/l with 23.3 ml of a solution of sodium hydroxide of 0.1 mol/l added thereto is diluted by water to provide 100 ml of an aqueous solution.

The alkaline buffer solution prepared by this composition is used simply in place of the buffer solution used in Example 1. Including the method of preparing an object to be washed, other conditions for a detergency test are similar to those of Example 6. The test provides a result, as shown in Table 3.

Example 8

A weak alkaline buffer solution of a pH of 8.0 is prepared as follows: 50 ml of a solution of potassium hydrogenphosphate of 0.1 mol/l with 46.1 ml of a solution of sodium hydroxide of 0.1 mol/l added thereto is diluted with water to provide 100 ml of an aqueous solution. The obtained alkaline buffer solution is used simply in place of the buffer solution used in Example 6. Including the method of preparing an object to be washed, other conditions for a detergency test are similar to those of Example 6. The test provides a result, as shown in Table 3.

Comparative Example 4

Figure 7:
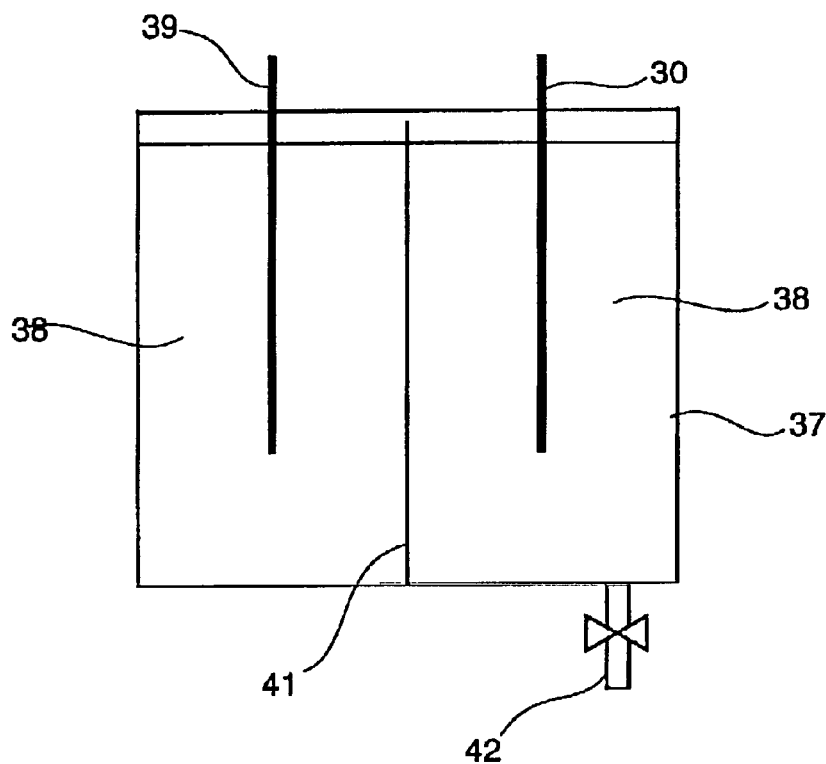
FIG. 7 shows a concept of a device producing alkaline ion water.

Alkaline ion water is produced electrolytically by the FIG. 7 commercially available ion water generator and used to wash an object. In the figure, a tank 37 is filled with a solution 38 containing an electrolyte. An electrolytic voltage is applied between a cathode 39 and an anode 30 with a cation permeable membrane 41 posed therebetween. Water thus obtained at anode 30 is referred to as alkaline ion water and it is extracted through output port 42 and used in Comparative Example 4. In general, tap water also contains an electrolyte sufficient for electrolysis. As such, if tap water is used an electrolyte is intentionally not dissolved.

As an alkaline ion water generator, Corona's alkaline ion water generator CI-2000 is used. It is connected to a faucet of tap water (of a pH of 6.8) an effects ionization applying electrolysis in an internal tank of the generator. The generator energized for one minute produces alkaline water having a pH of 9.5. The alkaline ion water thus obtained is used simply in place of the buffer solution used in Example 6. Including the method of preparing an object to be washed, other conditions for a detergency test are similar to those of Example 6. The test provides a result, as shown in Table 3.

Comparative Example 5

The buffer solution used in Example 6 is simply replaced with ion exchanged water. Including the method of preparing an object to be washed, other conditions for a detergency test are similar to those of Example 6. The test provides a result, as shown in Table 3.

It can be found from the above results that the detergent solutions of Examples 6–8 are superior in contaminant removal to those of Comparative Examples 4 and 5.

Example 9

10 g of sodium tetraborade (commercially available powder for pH standard solution) is dissolved in 500 ml of ion exchanged water to prepare a detergent solution for a detergency test. The detergent solution has a pH of 9.22 (at 20° C.). The detergency test is conducted with the detergent solution simply replacing the buffer solution used in Example 6. Including the method of preparing an object to be washed, other conditions for the detergency test are similar to those of Example 6. The test provides a result, as shown in Table 3.

It can be found that the detergent solution of Example 9 is superior in contaminant removal to those of Comparative Examples 4 and 5.

TABLE 3

|  |  | Example 6 Alkaline buffer solution | Example 7 Alkaline buffer solution | Example 8 Alkaline buffer solution | Comparative Example 4 Alkaline ion water | Comparative Example 5 Ion exchanged water | Comparative Example 9 Solution of pH standard powder |
|---|---|---|---|---|---|---|---|
| pH of detergent solution | | 10.5 | 10.6 | 8.0 | 9.5 | 8.0 | 9.22 |
| Detergency | Sample 1 | 82.4 | 81.8 | 55.6 | 40.5 | 20.1 | 79.2 |
|  | Sample 2 | 78.4 | 77.8 | 60.3 | 33.3 | 32.3 | 76.3 |
|  | Sample 3 | 86.4 | 83.1 | 61.1 | 36.0 | 31.8 | 81.5 |
| Average detergency | | 82.4 | 80.9 | 59.0 | 36.6 | 28.1 | 79.0 |

Example 10

In Example 10 a re-adherence preventive is added to the alkaline buffer solution of Example 6 by way of example. Ten milligrams of carboxymethyl cellulose (CMC) is added to 500 ml of the alkaline buffer water of Example 6 to provide a detergent solution. Including the method of preparing an object to be washed, other conditions for a detergency test are similar to those of Example 6. The test provides a result, as shown in Table 4.

Comparative Example 6

10 mg of carboxymethyl cellulose (CMC) is added to 500 ml of the alkaline ion water of Comparative Example 4 to provide a detergent solution. Including the method of preparing an object to be washed, other conditions for a detergency test are similar to those of Example 6. The test provides a result, as shown in Table 4.

Comparative Example 7

10 mg of carboxymethyl cellulose (CMC) is added to 500 ml of the ion exchanged water of Comparative Example 5 to provide a detergent solution. Including the method of preparing an object to be washed, other conditions for a detergency test are similar to those of Example 6. The test provides a result, as shown in Table 4.

Although adding a re-adherence preventive contributes to enhanced detergency, it can be recognized that the detergency in Example 10 is superior in contaminant removal to those of Comparative Examples 6 and 7

TABLE 4

|  | | Example 10 alkaline buffer solution | Comparative Example 6 alkali ion water | Comparative Example 7 ion exchanged water |
|---|---|---|---|---|
| pH of detergent solution | | 10.5 | 9.2 | 7.8 |
| detergency | Sample 1 | 90.2 | 49.6 | 41.5 |
|  | Sample 2 | 89.3 | 53.1 | 44.4 |
|  | Sample 3 | 91.7 | 55.4 | 46.7 |
| Average detergency | | 90.4 | 52.7 | 44.2 |

Industrial Applicability

In the present invention, an alkaline buffer solution or an electrolytically produced alkaline buffer solution can be used as a detergent solution so that a buffer action allows a pH to exhibit stability against stain and even when stain is being washed off a high level of alkalinity can be maintained and detergency can thus continue.

Furthermore, a detergent solution containing an ion of hypohalogenous acid having significant oxidation and decomposition and bactericidal effects can also simultaneously, electrolytically be produced to provide bactericidal activity when a detergent is not used to wash utensils. Furthermore, the ion of hypohalogenous acid that is produced in a buffer solution can prevent decomposition associated with variation in pH, so as to provide a steady effective ion concentration as well as improved conservation of a sterilizing detergent solution.

Furthermore, temperature is not increased in washing an object. As such, foods for example adhering to an interior of a dishwasher and thus remaining therein do not decay due to high temperatures, and a sterilizing detergent solution can also sterilize the interior of the dishwasher, so that foul odors and the like can be minimized effectively.

What is claimed is:

1. A washing apparatus having a detergent solution producing device provided with an electrolytic cell electrolyzing a solution of a mixture of an alkaline metal ion-containing aqueous solution and an inorganic salt of halogenous acid to produce an alkaline buffer solution in a vicinity of an anode and a solution of hypochlorous acid in a vicinity of a cathode, said apparatus washing an object with said alkaline buffer solution and said solution of hypochlorous acid extracted from said detergent solution producing device.

2. The apparatus of claim 1, wherein an electrolytic cell is divided between a cathode and an anode by an ion exchange membrane.

3. The apparatus of claim 2, wherein said ion exchange membrane is a cation exchange membrane.

4. The apparatus of claim 3, wherein said electrolytic cell closer to the cathode contains a solution of a mixture of an alkaline metal ion-containing aqueous solution and an inorganic salt of halogenous acid and said electrolytic cell closer to the anode contains an alkaline metal ion-containing aqueous solution.

5. The apparatus of claim 2, wherein said electrolytic cell is divided between the cathode and the anode by an ion exchange membrane into three, said ion exchange membrane being an anion exchange membrane positioned closer to the cathode and a cation exchange membrane positioned closer to the anode.

6. The apparatus of claim 5, wherein in said electrolytic cell divided in three, a portion closer to the cathode contains an inorganic salt of halogenous acid, a portion closer to the anode contains an alkaline metal ion-containing aqueous solution, and a portion sandwiched by said cation and anion ion exchange membranes contains an alkaline metal ion-containing aqueous solution and an inorganic salt of halogenous acid.

7. The apparatus of claim 1, wherein said alkaline metal ion-containing aqueous solution is one of sodium carbonate, sodium hydrogencarbonate, potassium carbonate, potassium hydrogencarbonate, and a complex salt thereof.

8. The apparatus of claim 1, wherein said inorganic salt of halogenous acid is sodium chloride, potassium chloride.

9. The apparatus of claim 1, wherein a solution of said alkaline buffer solution has a surfactant added thereto.

10. The apparatus of claim 1, comprising means washing the object with said alkaline buffer solution, means rinsing the object with water, and means sterilizing the object with said solution of hypochlorous acid.

* * * * *